(12) United States Patent
Yung

(10) Patent No.: US 9,098,320 B2
(45) Date of Patent: Aug. 4, 2015

(54) SYSTEMS AND METHODS FOR AUTOMATIC PROVISIONING OF A USER DESIGNED VIRTUAL PRIVATE DATA CENTER IN A MULTI-TENANT SYSTEM

(75) Inventor: John Chi Yung, Fremont, CA (US)

(73) Assignee: SAVVIS INC., Town and Country, MO (US)

( * ) Notice: Subject to any disclaimer, the term of this patent is extended or adjusted under 35 U.S.C. 154(b) by 365 days.

(21) Appl. No.: 12/646,591

(22) Filed: Dec. 23, 2009

(65) Prior Publication Data

US 2011/0153684 A1    Jun. 23, 2011

(51) Int. Cl.
*G06F 17/30* (2006.01)
*G06F 9/455* (2006.01)

(52) U.S. Cl.
CPC .................................. *G06F 9/45533* (2013.01)

(58) Field of Classification Search
USPC ............... 707/805, 795, 831; 718/1; 715/771; 711/203
See application file for complete search history.

(56) References Cited

U.S. PATENT DOCUMENTS

| | | | |
|---|---|---|---|
| 7,093,005 B2 | 8/2006 | Patterson | |
| 7,506,264 B2 * | 3/2009 | Polan | 715/757 |
| 8,468,455 B2 * | 6/2013 | Jorgensen et al. | 715/733 |
| 8,473,627 B2 * | 6/2013 | Astete et al. | 709/229 |
| 8,615,400 B2 * | 12/2013 | Laventman et al. | 705/1.1 |
| 8,732,856 B2 * | 5/2014 | Sack et al. | 726/30 |
| 9,059,933 B2 | 6/2015 | Doerr et al. | |
| 2004/0205179 A1 | 10/2004 | Hunt et al. | |
| 2005/0160156 A1 | 7/2005 | Kurosawa | |
| 2006/0224623 A1 | 10/2006 | Graziadio et al. | |
| 2007/0005786 A1 * | 1/2007 | Kumar et al. | 709/230 |
| 2008/0076425 A1 * | 3/2008 | Khetawat et al. | 455/436 |
| 2008/0175239 A1 | 7/2008 | Sistanizadeh et al. | |
| 2009/0276771 A1 * | 11/2009 | Nickolov et al. | 717/177 |
| 2010/0050172 A1 | 2/2010 | Ferris | |
| 2010/0198972 A1 | 8/2010 | Umbehocker | |
| 2011/0035248 A1 | 2/2011 | Juilard | |
| 2011/0126197 A1 * | 5/2011 | Larsen et al. | 718/1 |
| 2011/0138384 A1 | 6/2011 | Bozek et al. | |
| 2012/0054624 A1 | 3/2012 | Owens, Jr. et al. | |

(Continued)

FOREIGN PATENT DOCUMENTS

| | | | |
|---|---|---|---|
| JP | 2004-501413 A | 1/2004 | |
| JP | 2004-272908 A | 9/2004 | |

(Continued)

OTHER PUBLICATIONS

European Patent Application No. 10840103.5; Communication pursuant to Rules 70(2) and 70a(2) EPC dated Mar. 12, 2014; 1 page.

(Continued)

*Primary Examiner* — Robert Beausoliel, Jr.
*Assistant Examiner* — Alexandria Bromell
(74) *Attorney, Agent, or Firm* — Swanson & Bratschun, L.L.C.

(57) ABSTRACT

Systems and methods for a multi-tenant and fully automated Virtual Private Data Center (VPDC) provisioning. Examples include user interfaces for drag-and-drop configuration of a customer/user/tenant's network, validation checks on design choices, and automated provisioning of validated designs. The tenant may specify certain Quality of Service (QoS) choices along with the design structure, and various physical components and partitions of available and/or shared resources may be provisioned automatically for the tenant/customer.

21 Claims, 5 Drawing Sheets

(56) References Cited

U.S. PATENT DOCUMENTS

2013/0070757 A1* 3/2013 Elliott et al. ............... 370/352
2013/0246922 A1   9/2013 Doerr et al.
2013/0290960 A1* 10/2013 Astete et al. .................. 718/1
2014/0033200 A1*  1/2014 Tompkins ..................... 718/1

FOREIGN PATENT DOCUMENTS

JP    2005-235163 A    9/2005
WO    WO 01/50329 A2   7/2001

OTHER PUBLICATIONS

Partial European Search Report for European Patent Application No. 10840103.5; Feb. 20, 2014, 9 pages.
U.S. Appl. No. 13/875,644; Non-Final Rejection dated Mar. 31, 2014; 19 pages.
Partial European Search Report for European Patent Application No. 11177590.4, Oct. 2, 2013, 4 pages.
U.S. Appl. No. 12/870,594; Non-Final Rejection dated Dec. 5, 2012; 13 pages.
International Search Report and Written Opinion prepared by the U.S. Patent Office as International Searching Authority for PCT International Patent Appl. No. PCT/US2010/061736, mailed Feb. 18, 2011; 6 pages.
Singapore Patent Application No. 201203972-3; Written Opinion dated Jul. 18, 2013; 6 pages.
Supplemental European Search Report for European Patent Application No. 11177590.4, Aug. 30, 2013, 8 pages.
Kato (2009) 332:38-39, Nikkei Solution Business, Nikkei Business Publications, Inc., "KDDI Cloud Server Service," English translation.
Mori (2009), 29(1):17-26, Unisys Technology Review, Nihon Unisys, Ltd., "A Next Generation iDC Concept 'MiF' of Nihon Unisys," English translation.
Japan Patent Application No. 2012-546183, Office Action dated Oct. 15, 2013, 34 pages, Japan and English translations.
Communication Pursuant to Article 94(3) for European Patent Application No. 11177590.4, dated May 20, 2014; 7 pages.
Japan Application No. 2012-546183; Decision of Rejection dated Jun. 16, 2014; 4 pages; Japanese and English Translation.
U.S. Appl. No. 13/875,644; Non-Final Rejection dated Sep. 8, 2014; 16 pages.
U.S. Appl. No. 13/875,644; Issue Notification dated May 27, 2015; 1 page.
U.S. Appl. No. 13/875,644; Notice of Allowance dated Feb. 9, 2015; 13 pages.

* cited by examiner

100

SYSTEMS AND METHODS FOR AUTOMATIC PROVISIONING OF A USER DESIGNED VIRTUAL PRIVATE DATA CENTER IN A MULTI-TENANT SYSTEM

BACKGROUND

Enterprise customers, such as businesses, non-profits, governments, etc., continue to rely on information technology and network architectures as their communication and productivity infrastructure. With the continued increase in public network bandwidth and availability, these IT and network services may be provided by outside companies, which leverage shared resources and expertise to provide a greater cost-savings to subscribing customers.

Several component provisioning systems are currently in use, even some with direct customer interaction (e.g., shared storage space provisioning). Additionally, there exists IT tools such as Configuration Management Databases (CMDB) that maintain device specifications and interactions of multi-user systems. However, provisioning an entire virtual data center remains a technical and complicated task, unsuitable for direct customer interaction.

Thus, there exists a need in the art for a user friendly virtual data center provisioning application that leverages existing components, and ties in new components to go from initial customer input to fully functioning virtual data center from shared resources.

DETAILED DESCRIPTION

The present invention provides a portal manager able to facilitate Virtual Private Data Center (VPDC) configurations from multiple customers. The portal manager may interface with a client interface and facilitate drag-and-drop design of a VPDC using generic components with customizable features. During the design, the portal manager may receive validation checks from the user interface and facilitate validation for physical capacity, user privileges, and component compatibility. Each of the validity checks may be required to be performed for each customer selection with respect to the overall VPDC design. For example, the shared resources may have the physical capacity to facilitate a design choice, and the customer may have the available privileges for that design choice, but if provisioning the design would result in a failure of some other customer's service expectancies of greater priority, then the portal manager may declare the choice invalid.

Once the design is completed by the user, and validated by the portal manager, a generic data-structure may be compiled based on the completed design file. The generic data-structure may have the relationships and attributes described or inherent to the design layout created by the user. This data-structure may then be parsed and filled with individual devices or logical segments of devices with reference to the CMDB. Each component of the CMDB may have a unique ID, and the CMDB may maintain information about each component's compatibility with other components so that the parser may select appropriate and available components to populate the data-structure. Once the data-structure includes specific device instances, a provisioning manifest may be compiled. The provisioning manifest may include a series of instructions for the various provisioning components, such that the entire provisioning process is automated from the manifest instructions. The system may facilitate this provisioning for multiple customers, and one or more VPDCs for each customer.

Figure 1:
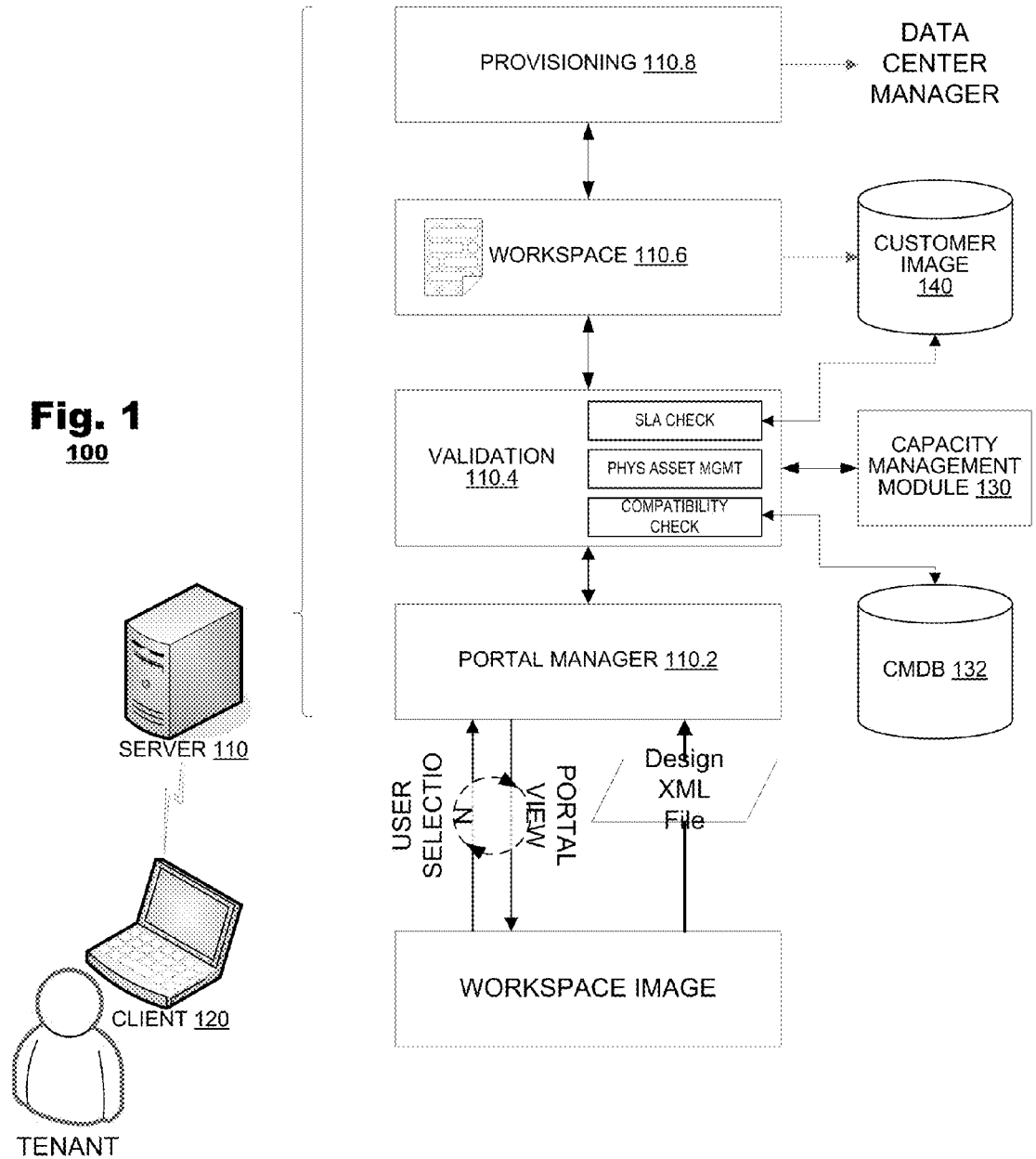
FIG. 1 is an illustration of an example system according to an example embodiment of the present invention.

FIG. 1 is a block diagram of a VPDC provisioning system 100. The system 100 may provide a software platform through which a VPDC customer (called "tenant" and/or user herein) initially configures or reconfigures a VPDC. The provisioning may be executed on a separate network (not shown) that may support VPDC provisioning for several tenants. The VPDC provisioning system may execute on one or more networked servers. Tenants may access VPDC provisioning services via a portal connection that extends from the provisioning system's servers to a client device managed by the tenant.

FIG. 1 illustrates a software architecture of the VPDC provisioning system 100 that may execute on a server, e.g., server 110. The system 100 may include a portal manager 110.2 in communication with a client device 120 that manages the portal connection and captures user input. The portal manager 110.2 may provide a user with a user interface for designing a VPDC. For example, various design views may be transmitted to a workspace image (e.g., a user's browser), and receive various user selections. The portal manager 110.2 and/or workspace image may construct an XML design file that may include the final result of the design process.

The system 100 may include a validation module 110.4 that may validate user provisioning requests and may reject requests that fail one or more validation tests. The validation module 110.4 may perform several validation checks. First, the validation module 110.4 may perform a check of the physical capacity by a physical asset management sub-module. The physical asset management sub-module may interface with a capacity management module 130 to determine the data center system has sufficient physical assets to meet the user request. The capacity management module 130 may store data representing the physical assets of the Data Center in its entirety and further representing physical assets that are allocated for use by other VPDCs of Data Center tenants. For example, a data center may organize physical compute hosts into clusters of sixteen. The sixteen host cluster may be assigned a maximum virtual compute unit for allocation. Each virtual host may consume different assigned compute units according QoS settings (e.g. four for Enterprise, two for Balanced and one for Essential). When a Balanced VPDC has two virtual hosts, four compute units may be deducted from the cluster. In addition to a unit host count to provide a level of service, the capacity management module may evaluate total VPDC compute resource consumption and determine the best compute cluster to provision based on available resources.

Second, the validation module may perform an entitlement check to determine if a user's credit and permission status affords the user permission to allocate the requested resource(s). The entitlement sub-module may review a tenant service agreement (stored in a customer image database 140) to determine if the tenant has sufficient privileges to provision a selected resource in the tenant's VPDC design. The validation module may perform a web service call to the CMDB to retrieve an available credit limit for the calling user. For example, a user may have $10 k MRR (monthly recurring revenue) approved for the account or pre-charged to the account (e.g., held as a positive account balance). The VPDCs may have MRR values which may include the VPDC costs and sub-component costs, such as virtual machines (VMs) and storage. The cost of the selected VPDC may then be validated against the returned customer credit value, and deducted from the customer credit value once validated and provisioned. Third, the validation module 110.4 may include a design validation sub-module, which may determine if the tenant's selection represents a technically compatible selection.

The system 100 may include a workspace manager 110.6 that may build a VPDC image based on the user input. If the tenant is reconfiguring a previously provisioned VPDC, the workspace manager may retrieve previously configured VPDC images from storage (shown as a customer image DB 140). If the tenant is building a VPDC from scratch, the workspace may be opened in a blank design area or opened from a template of VPDCs. The system 100 may include a provisioning manager 110.8, which may commit a workspace image when the tenant has completed its VPDC configuration. The workspace image may be created and stored as an XML design file, or any number of other file formats configured to store design data for the VPDCs. The image may be stored to the customer image database. The provisioning manager may automatically provision all VPDC elements using orchestration tools.

At the client device 120, the portal interface may present a workspace for configuring the VPDC. The client interface may include a workspace displaying an image corresponding to an image maintained at the server 110. The client interface may include provisioning tools to open, save, and commit a workspace image. The client interface may include a template of VPDC resources that are available for addition to the workspace image (e.g., as further described with reference to FIG. 3 below). The resources may be added to the workspace via drag-and-drop operations.

Figure 2:
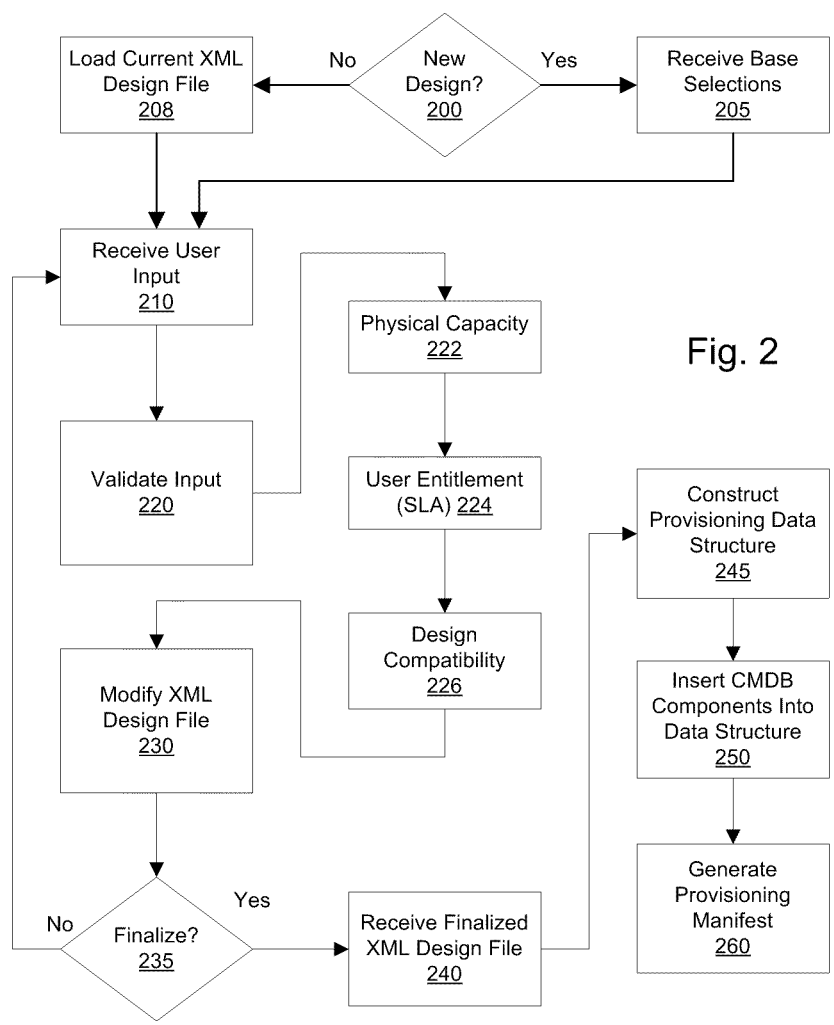
FIG. 2 is an illustration of an example method, according to an example embodiment of the present invention.

FIG. 2 illustrates one example embodiment of an example process. First, at 200, the process may receive input from a user about either a new VPDC or an existing VPDC. If the user is going to modify an existing VPDC, the process may load a previously created and saved design file (e.g., at 208). Alternatively, the process may re-construct a design file from a current configuration. In this way, a user may pull up their current configuration so that they may make modifications as needed. If the user is going to begin a new VPDC design, the example procedure may start with a base design selection (e.g. at 205). For example, the user may start by selecting one of several Quality of Service (QoS) levels (e.g., Enterprise, Balanced, Essential). These base configurations may load a range of default settings appropriate for different environments, from testing/development to mission critical applications.

Next, at 210, the user may be allowed to customize their VPDC, as the example procedure receives input, e.g., adding a new host to the configuration. Each user input may also be validated at 220 for one or more criteria (e.g., 110.4). In this example, the example procedure may check to ensure the service provider has the physical capacity to accommodate the user selection (e.g., at 222). The example procedure may check an entitlement associated with the customer to ensure the customer is entitled to construct a VPDC with the particular selection (e.g., at 224). The example procedure may check a configuration management database (CMDB) to ensure the selection made is technically compatible with the other selected options already part of the design. For example, if the user has a firewall service that attempts to take action on the inside interface with "Public" Internet, the example procedure may return an error, advising the customer that one or the other must change. Once the user input is fully validated, the example procedure may modify the XML design file to reflect the selection that was made (e.g., at 230). As illustrated in 235, the user input and validation process may repeat until the design is finalized. Once complete and finalized, the user interface may pass the finalized XML design file to a middleware application (e.g., at 240).

At 245, the middleware application may construct a provisioning data-structure, which may leverage existing VM components and interfaces, while adding necessary attributes and functions for the example process. The provisioning data structure may act as a blue-print for the physical/logical allocations. The middleware application may retrieve CMDB attributes and insert into provisioning data-structure according to matching objects for CMDB and Cloud infrastructure to have consistent relationship records. From this, the example process may generate a provisioning manifest, e.g., a list of instructions the asset management system requires to finally construct and allocate the designed VPDC. This manifest may be sent to a provisioning engine, which may fully and automatically implement the validated design.

The system may include a configuration management database (CMDB). Every item in the product catalog may have a unique component ID in the CMDB, along with a list of those components' compatibilities and incompatibilities with other components. When a user makes a design modification (e.g., adjusting the processor speed capability of a host from medium to large) the CMDB may be referenced to ensure there is some component available for facilitating that design choice. Later, in actual back-end implementation, the example process may select that component, or a different but also compatible component for the logical provisioning.

Figure 3A:
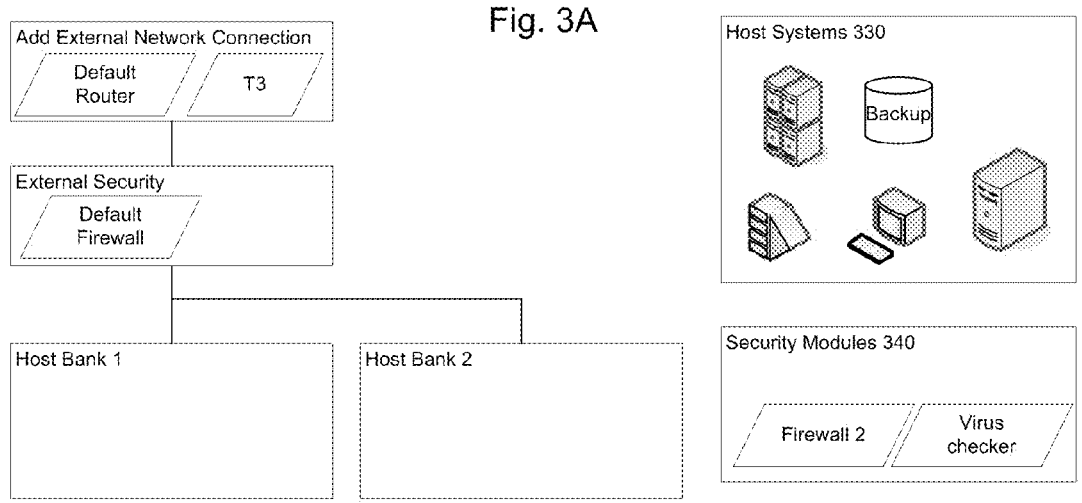
FIG. 3A and FIG. 3B are example illustrations of example graphical user interfaces, according to example embodiments of the present invention.
Figure 3B:
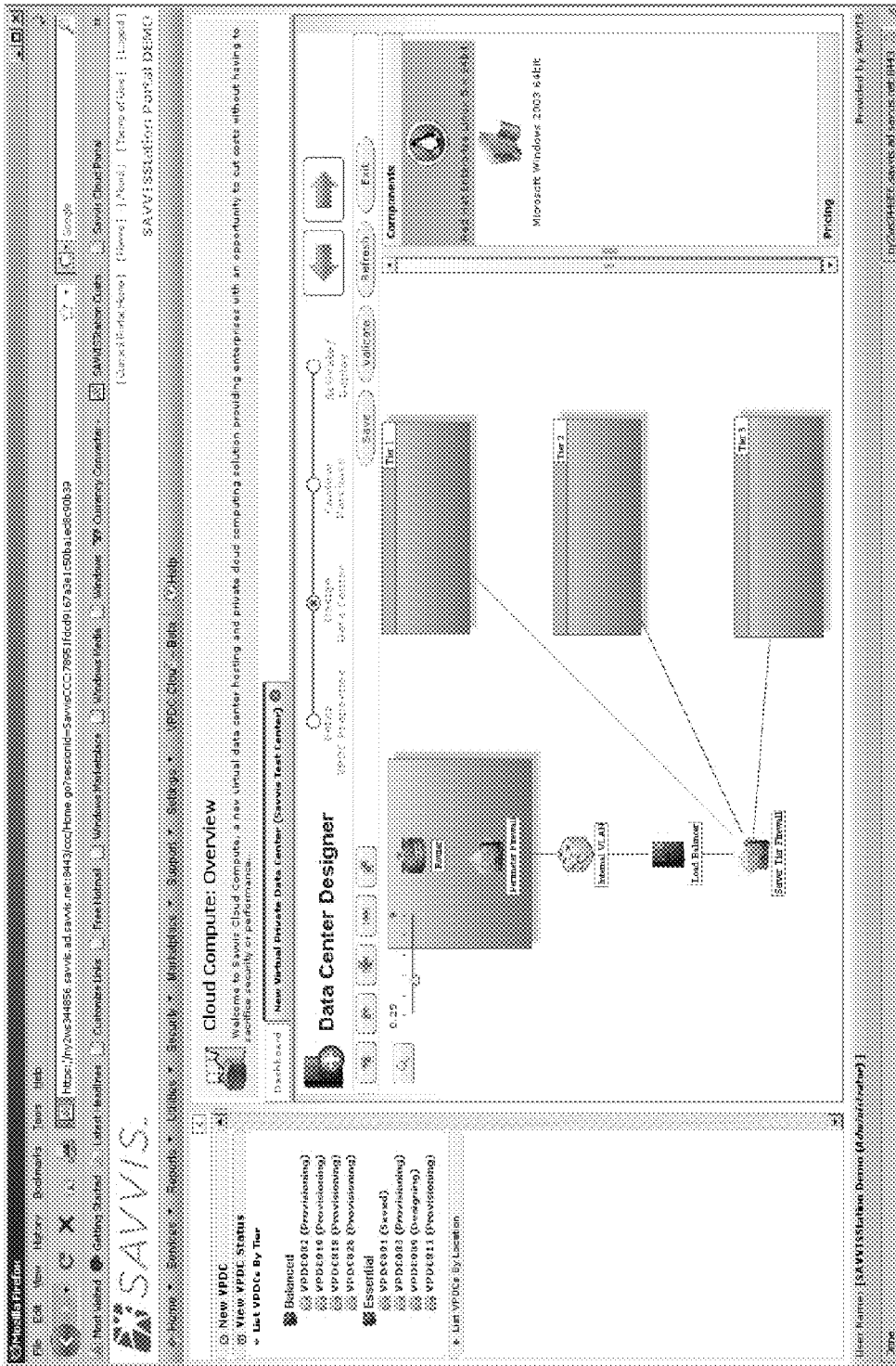

FIGS. 3A and 3B illustrate two simple drag and drop user interfaces. On the left side of the screen of FIG. 3B is an example of an existing VPDC list, where saved VPDCs are listed. Selection of one of these finished or work-in-progress VPDCs may load the various configuration indicators into the Data Center Designer (e.g., as illustrated in the mid-screen section). Alternatively, a user may begin a new VPDC design, which may have one or more defaults loaded in, based on initial settings (e.g., QoS) indicated by the user. Default settings may also be included where a base level device (e.g., a firewall) is required. Here, the network connection may specify various components such as routers, port managers, bandwidth connections, etc. The external security section may have a default firewall, and the host banks may be empty as shown. The infrastructure catalog may be presented on the right and may contain various sections of the available product catalog, e.g., host systems and security modules (e.g., 330 and 340). A user may be able to click and drag items (e.g., firewall 2) over to the design area. As previously discussed, every action that modifies the design may be passed to the middleware for validation. For example, a user may be warned that implementing both the default firewall and firewall 2 is incompatible, and prompt the user to find out if the default firewall should be removed as a result of the addition of firewall 2. The user can fully customize the layout of the VPDC structure and design using these tools. Additional attributes are also customizable. For example, a user may move a Linux based server into the design. The user may then click on that server and adjust individual attributes, e.g., storage size, processor speed, etc.

The middleware component may act as a broker between a user interface (e.g., XML-based drag-and-drop GUI) that provides the user representations of components in the product catalog, and one or more virtual provisioning mechanisms. The middleware may translate the XML GUI design into specially designed provisioning data-structures, modeled on the CMDB structure. The provisioning data-structure created in the middleware includes appropriate compatibility and design algorithms/rules, the VPDC may have every component provisioned in an inherently-validated design (e.g., due to the repetitive triple validation steps) based on the graphical layout provided by the user interface XML document.

Responsive to a new provisioning request, a physical capacity check is performed to ensure the shared resource pool includes the capacity to perform the requested provisioning. Resources are classified as committed, reserved and available. Committed resources are capacity subscribed by customers. Reserved resources are capacity allocated for VPDCs in the design state. If a VPDC enters a saved state it releases allocated resources until loaded again. Available resources are capacity free for new VPDC design. The ratio of physical to virtual computing is different according to service grades. Example QoS levels may have descriptive titles (e.g., Enterprise, Balanced, Essential, etc.), and may allocate virtual machines per physical asset, according to the QoS level selected. Different physical hardware may have different sharing ratios for the different QoS levels.

Figure 4:
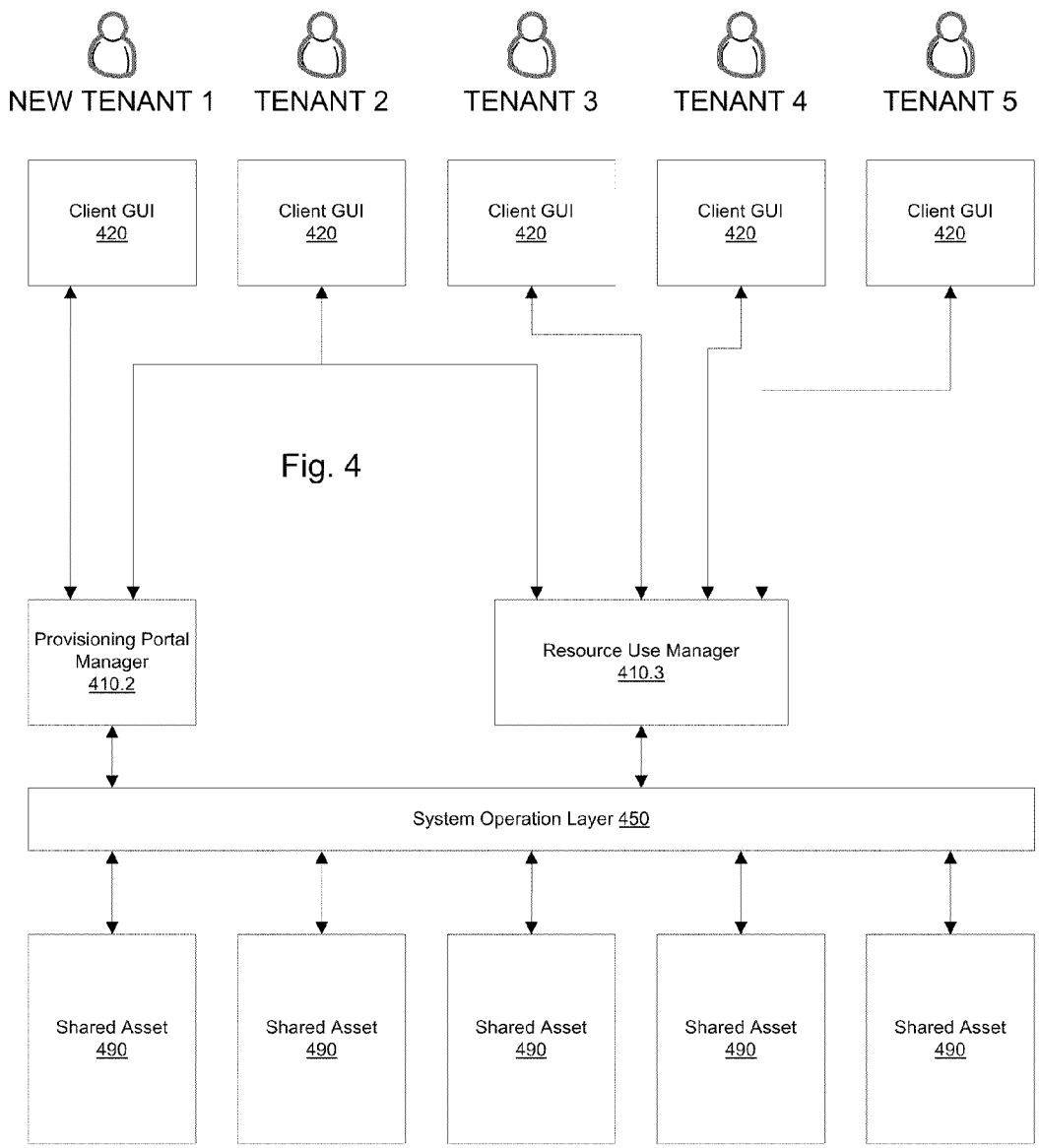
FIG. 4 is an example multi-tenant architecture, according to an example embodiment of the present invention.

Just as validation is performed with respect to the requesting tenant's VPDC design, the physical capacity validation must be performed with respect to every other tenant's committed resource allocation and QoS requirements. Various formulas may be employed to ensure resource consumption does not exceed resource availability beyond the QoS levels implemented. FIG. 4 illustrates one example embodiment of a multi-tenant architecture. There may be various shared assets 490, which may include servers, disk arrays, back-up drives, network connections, etc. There may be a system operation layer 450 that may span the virtual systems to facilitate the various example methods and provisioning requirements. There may be a provisioning portal manager 410.2 that may receive new VPDC requests from users, and facilitate the provisioning of those requests. There may be a resource use manager 410.3 that may facilitate the ongoing use of shared resources that have already been provisioned to users. Each tenant/user may have one or more client GUIs 420. As illustrated, some tenants may be new (e.g., tenant 1), some tenants may have ongoing VPDCs (e.g. tenants 3 to 4), and some tenants may have established VPDCs and request provisioning of additional VPDCs (e.g., tenant 2).

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

I claim:

1. A method of provisioning a Virtual Private Data Center (VPDC), comprising:
   providing a design user interface to a user including controls to select and configure computing hardware resources to be allocated to the VPDC of the user in a data center;
   receiving the computing hardware resource configuration selections from the user;
   comparing the computing hardware resource configuration selections to component compatibility information of each selected computing hardware resource in a configuration management database (CMDB), the CMDB storing a list of specific device instances for each of the computing hardware resources in the data center and compatibility information for different configurations of the specific device instances;
   validating responsive to the comparing that the configuration selections are compatible with each other;
   if validated, constructing a provisioning data structure based on the validated configuration selections including the user selected computing hardware resources and the user selected configuration of the selected computing hardware resources from the validated configuration settings;
   populating the provisioning data structure with specific device instances from the list of components in the CMDB; and
   generating a provisioning manifest to a data center provisioning system for provisioning the VPDC, the provisioning manifest including instructions for automatically provisioning the specific device instances specified in the provisioning data structure with the user selected configuration specified in the provisioning data structure.

2. The method of claim 1, wherein the configuration selections includes at least a quality of service indication.

3. The method of claim 1, wherein the validation includes validating the VPDC system for sufficient capacity, validating the entitlement of the user, and validating compatibility of the received configuration selections.

4. The method of claim 1, wherein the provisioning manifest includes a list of specific instructions that, when executed, facilitate a provisioning of a validated VPDC design.

5. The method of claim 1, wherein the validating is done for each selection, after the receiving of that respective selection and prior to the receiving of additional selections from the user.

6. The method of claim 5, wherein the constructing occurs after all selections have been validated.

7. The method of claim 1, wherein the validated configuration selections are stored in an XML design file.

8. The method of claim 1, wherein providing the design user interface includes providing a design area, providing a component area, and receiving drag and drop input from the user populating the design area with component selections from the component area.

9. The method of claim 1, wherein the provisioning of the VPDC is fully automated, such that the user is a customer designing and purchasing the VPDC, and wherein the VPDC is provisioned from the provisioning manifest without assistance from an administrator of the VPDC.

10. A method of supporting Virtual Private Data Center (VPDC) provisioning, comprising executing a VPDC provisioning system, at a server, that:
    communicates with a user via a portal connection, receiving configuration selections from the user that include a selection and a configuration of computing hardware resources in a data center to be allocated to the VPDC of the user;
    compares the computing hardware resource configuration selections to component compatibility information of each selected computing hardware resource in a configuration management database (CMDB), the CMDB storing a list of specific device instances for each of the computing hardware resources in the data center and compatibility information for different configurations of the specific device instances;

validates responsive to the comparing that the configuration selections are compatible with each other;

validates the configuration selection against a user service level agreement to ensure the user has sufficient privileges to provision a selected resource in the VPDC;

validates that sufficient specific device instances are available for allocation to the VPDC;

constructs a provisioning data structure based on the validated configuration selections including the user selected computing hardware resources and the user selected configuration of the selected computing hardware resources from the validated configuration settings;

assigns specific device instances from the list of components in the CMDB to the provisioning data structure; and outputs a provisioning manifest to a data center provisioning system for provisioning a VPDC, the provisioning manifest including instructions for automatically provisioning the specific device instances specified in the provisioning data structure with the user selected configuration specified in the provisioning data structure.

11. The method of claim 10, wherein the provisioning manifest is constructed based on the provisioning data structure that is populated with actual device assignments.

12. The method of claim 10, wherein the provisioning manifest includes instructions that cause the data center provisioning system to automatically provision a VPDC corresponding to the configuration selections from the user.

13. The method of claim 10, that further comprises:
executing the method for multiple distinct enterprise customers.

14. A VPDC provisioning computer system, comprising:
a design server configured to:
provide a portal connection to a graphical user interface, and receive selections from a user describing a VPDC configuration that include a selection and a configuration of computing hardware resources in a data center to be allocated to the VPDC of the user;

compare the computing hardware resource configuration selections to component compatibility information of each selected computing hardware resource in a configuration management database (CMDB), the CMDB storing a list of specific device instances for each of the computing hardware resources in the data center and compatibility information for different configurations of the specific device instances;

validate responsive to the comparing that the configuration selections are compatible with each other;

validate the configuration selections against a user service level agreement to ensure the user has sufficient privileges to provision a selected resource in the VPDC;

validate that sufficient specific device instances are available for allocation to the VPDCs;

construct a provisioning data structure based on the validated configuration selections including the user selected computing hardware resources and the user selected configuration of the selected computing hardware resources from the validated configuration settings;

populate the provisioning data structure with specific device instances from the list of components in the CMDB;

construct a provisioning manifest based on the populated provisioning data structure, the provisioning manifest including instructions for automatically provisioning the specific device instances specified in the provisioning data structure with the user selected configuration specified in the provisioning data structure; and output the provisioning manifest to a data center provisioning system for automatically provisioning the VPDC.

15. The VPDC provisioning computer system of claim 14, further comprising:
a provisioning server, configured to:
receive the provisioning manifest; and
execute the manifest's instructions to provision the VPDC.

16. The VPDC provisioning computer system of claim 14, wherein the design server is further configured to load a design file describing an existing VPDC into the graphical user interface.

17. The VPDC provisioning computer system of claim 16, wherein the design server is further configured to, responsive to user input received at the portal connection indicating a command to modify an existing VPDC, reconstruct the design file based on an associated provisioning data structure.

18. The VPDC provisioning computer system of claim 14, wherein the graphical user interface includes an interface for selecting saved or existing VPDC designs, an interface populated with components available for user selection, and a design area for receiving drag-and-drop input from the user consisting of the components available for user selection.

19. The VPDC provisioning computer system of claim 18, wherein the components available for user selection are computing hardware resources with configurable attributes and wherein a correlation between a computing hardware resource with a specific attribute state and one or more physical components of the specific device instances of the computing hardware resource is maintained by the design server.

20. The VPDC provisioning computer system of claim 14, wherein a validation is performed after each user input that modifies the VPDC configuration, wherein invalid input produces an error message and valid input is committed to a design file.

21. The VPDC provisioning computer system of claim 20, wherein the provisioning data structure is constructed from the design file.

* * * * *